United States Patent Office 2,782,241
Patented Feb. 19, 1957

2,782,241

BARK TREATMENT PROCESS AND PRODUCT

Kenneth Russell Gray and Hartzell Lance Crosby, Shelton, Wash., assignors to Rayonier Incorporated, Shelton, Wash., a corporation of Delaware No Drawing. Application March 2, 1955,
Serial No. 491,796

19 Claims. (Cl. 260—619)

This invention relates to the digestion of bark to derive chemicals therefrom, and has for its object the provision of an improved process of digesting certain coniferous barks and an improved chemical product resulting from the digestion. The process of the invention comprises digesting the coniferous barks, in a suitable state of subdivision, with an aqueous solution of sodium or potassium hydroxides at a suitably elevated temperature to convert part of the water-insoluble portion of the bark to a water-soluble alkali derivative. The process of our invention results in the recovery of a relatively high percentage of chemicals from the bark consisting of soluble polymeric aromatic hydroxyl materials in the form of alkali metal salts or derivatives.

The coniferous barks which we have found to have properties which make them effective in carrying out the process of our invention and in producing our improved chemical products are the following: Western hemlock (*Tsuga heterophylla*), Douglas fir (*Pseudotsuga menziessi*), Western white fir (*Abies concolor, Abies grandis* and *Abies amabilis*), Sitka spruce (*Picea sitchensis*), Southern yellow pine (*Pinus echinata, Pinus palustris, Pinus taeda, Pinus elliotti* and *Pinus rigida* var. *serotina*). The invention is not only concerned with the treatment of these barks individually, but with blends or mixtures of these barks.

Barks of the aforementioned trees are considered to contain two different classes of phenolic material of relatively low methoxyl content. One of these classes is phlobatannins which are considered to be polymers of catechins or of other polyhydroxy aromatic material. The second class consists of insoluble, or relatively water-insoluble, polyhydroxy aromatic material resembling the phlobatannins but which probably has a higher molecular weight. Such water-insoluble polyhydroxy aromatic material is herein termed phlobaphenes. The barks also will contain an aromatic polymer high in methoxyl but relatively low in phenolic hydroxyl content, resembling wood lignin. Under the conditions of the invention, however, very little of this highly methoxylated material will be extracted.

The bark of Douglas fir also contains varying proportions of waxes which may have commercial value. If, for example, the bark is extracted with an organic solvent to remove and recover the waxes present, the extracted residue may be advantageously used in preparing the products of the invention.

As used in this specification, "phenolic hydroxyl group" refers to any hydroxyl group attached to an aromatic ring irrespective of the nature of any bond or bonds between said aromatic ring and other cycloaliphatic, aliphatic or aromatic groups. Thus, for example, in the formula of the typical catechin below, which is considered to be an unpolymerized precursor of tannins and phlobaphenes, there are four phenolic hydroxyls and one aliphatic or alcoholic hydroxyl, the latter being on the cycloaliphatic ring.

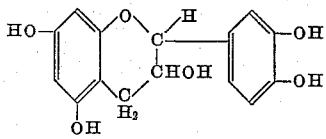

As used herein, the term "phenolic material" refers to any compound or mixture of compounds containing phenolic hydroxyl groups, i. e. aromatic hydroxyl groups. Wherein a specific compound is referred to by the word "phenol" (i. e. reference simply to "phenol" rather than to "a phenol") this refers to monohydroxylbenzene.

The reaction of the barks with the alkali hydroxide must be carried out under critically controlled conditions to solubilize selectively only the desired portion which is high in aromatic hydroxyl groups, and to leave unsolubilized unwanted polymeric non-phenolic material. In accordance with the process of our invention the coniferous bark is digested in a water solution of sodium or potassium hydroxide at a temperature of from about 65° C. to 185° C. until a part of the water-insoluble portion of the bark is converted to a water-soluble alkali derivative thereof, and alkali hydroxide equivalent to about 0.03 to 0.10 part Na$_2$O (0.04 to 0.13 part sodium hydroxide) per part of dry bark is combined with bark substance, and the resulting water-soluble product is separated from the bark residue. The concentration of water solution of alkali is preferably about 0.5% to 2.00% of sodium hydroxide.

The polymeric products of the invention are water-soluble polymeric hydroxy aromatic compounds in the form of their alkali metal salts or derivatives. The products of the invention can be used in place of simple phenols for many purposes, and are equal or superior to tannins as deflocculants, and are especially effective drilling mud additives. When prepared in a dry state they are stable and do not change materially over long periods of time.

The process of the invention will be described in detail with reference to the digestion of Western hemlock bark, and it is to be understood that the barks of the aforementioned coniferous trees may be digested in the same manner to produce similar products.

Bark from the trees is usually obtained in large pieces which are preferably reduced in size to pass screens of about 2 to about 20 meshes to the inch in order to avoid an excessive amount of void space in the charge and to permit penetration of the alkali solution. As an operating expedient it is desirable to avoid an excessive amount of fines, such as bark dust which sometimes clogs the filters, although such fines may be in a state of subdivision conducive to rapid penetration and digestion.

Satisfactory products of the type sought in accordance with this invention are obtained by heating the bark with an aqueous alkali-metal hydroxide solution at a temperature of from 65° C. to 185° C., having present the ratio of sodium or potassium hydroxide to bark of 0.03 to 0.10 part of hydroxide, expressed as Na$_2$O equivalent, per part of oven dry bark in the reaction mixture.

The concentration of alkali-metal hydroxide in the alkali-metal hydroxide solution used may vary from about 0.5% to 2% which is equivalent to bark consistencies (i. e. % bark in slurries) of about 3.7% to 34.1% and in the preferred cases from about 10–20%. In these preferred cases the total water present in the reaction mixture permits sufficient fluidity so that the reaction mixture may be readily agitated and brought uniformly to reaction temperature during the reaction period. Uniform mixing of the chemical and the reaction mass may thus be achieved and uniform temperatures readily attained and maintained. The reaction temperature is maintained until the pH of the reaction mixture falls to a value between about 8.5 to 10 measured at room temperature. This pH represents very low unconsumed alkali-metal hydroxide. Under preferred conditions, a ratio of about 0.05 part of alkali-metal hydroxide expressed as $Na_2O$ per part of oven dry bark is used in the reaction mixture which has a consistency of about 10% to about 20% bark and in the optimum with a caustic soda solution concentration of about 1%. The preferred temperature range is from 95° to 150° C. and the most advantageous reaction temperatures are about 125° to 150° C.

One important aspect of the invention is the necessity to keep the total alkali-metal hydroxide ratio to bark below 0.1 (expressed as $Na_2O$) to avoid solubilizing nonphenolic bark components and thereby degrading the product. The time required for this reaction may be in the range of 0.5 to four hours. It has been found that 80% as much of the product is obtained by heating the bark 30 minutes as is obtained by heating it for four hours. Longer heating periods than four hours offer no advantage and cause undesirable alteration of the products. Within two hours and sometimes less, the desired reaction or solubilization is essentially complete and the digestion may be terminated without undue loss of the desired product.

An excess of water over the amounts indicated tends to slow the reaction by undue dilution of the chemical, requires excessive space in the digesters, and eventually gives a very dilute product solution requiring a correspondingly costly evaporation to recover the product as concentrated solutions or solids. In general, it is desirable, but not necessary, to agitate the charge in the digester although continuous mixing reduces somewhat the time of reaction. Depending upon the temperature of the reaction, the process may be conducted in an open vessel or in a closed vessel. Either open or closed extraction vessels may be used and the extraction may be conducted batchwise or continuously provided uniform temperatures and chemical distribution are obtained by suitable agitation, except, of course, that pressure vessels are required for treatments at temperatures above the boiling points of the reaction mixtures. The process is ideally suited to continuous operation, and such operation is preferred.

Following the digestion, the solubilized products of the reaction as well as other water-soluble materials are separated. This can be accomplished by filtering on a vacuum filter, followed by washing, provided that thin filter cakes are maintained. This method, while economically practical, is not the most desirable since the reaction mass is of a somewhat gelatinous nature. Some of the soluble products of reaction are contained in solution and some are occluded in the gelatinous material. In view of the high molecular weight of the product and its slow diffusion rate from the gelatinous material, the separation of the product by washing operations or other operations dependent on diffusion has disadvantages. Washing operations involve uneconomic dilution, and the recovery of product is not even relatively complete unless many changes of water and prolonged soaking periods to effect diffusion are provided.

Effective and rapid separation of substantially all soluble products of digestion is preferably accomplished by mechanical dislodging aids. Such mechanical dislodging aids or expressing means effectively separate occluded solution and the soluble reaction product contained therein from the bark residue. Expressing, as by compressing the mixture of watery material and bark residue in a continuous screw press or in a batch hydraulic press, is especially effective in that solutions of maximum concentration are producible. Using batch pressing it will frequently be found desirable to reslurry the pressed residue in water and repress. In a typical case, pressing the cake to a final moisture content of 60% effected recovery of about 90% of the content of solubilized solid. Substantially complete recovery of the balance was obtained by diluting the press cake with water and pressing a second time. Advantageously the effluent from the second pressing containing the remaining 10% solids may be recycled to form the make-up solution in a subsequent cook. In this manner the effluent from the first press is recovered at maximum solids content, thereby facilitating subsequent evaporation.

The filtrate from the presses may be subjected to a clarifying filtration or settling operation. It is then concentrated by evaporation. Concentration is most desirably effected by vacuum evaporation and most economically by using multiple effect vacuum equipment. Conveniently solutions of about 25% to about 50% concentration are produced. Solutions of higher concentration than 50% have high viscosities which are difficult to handle.

The concentrated liquor may be used directly as a phenolic reactant or for other uses, if used without undue delay. If the concentrated solutions are allowed to stand for a considerable time, a rubbery scum, possibly due to polymerization, usually forms on the surface. Such insoluble material must be removed before using the solution and this results in loss of product.

We find, however, that if either concentrated or dilute solutions are subjected to an essentially flash drying operation, the product may be converted to a stable solid or dry form without any detectable polymerization or other change in chemical properties. Such flash drying may be approximated in vacuum drum drying but is most advantageously accomplished in spray dryers. The latter have been found to be particularly desirable in producing a material having excellent physical properties and freedom from alteration by either degradation or polymerization. The dry product retains its solubility, reactivity and general chemical characteristics and may be stored practically indefinitely without loss of alteration of these products.

As heretofore pointed out, if bark is heated with caustic soda in amounts to dissolve substantially all the potentially alkali-soluble materials, the resulting dissolved material is of very little or no use in place of phenols in the preparation of resinous products. We find that this is the result of both a low content of phenolic groups in the product and a high content of soluble nonphenolic materials. It is common practice in the preparation of various plastic materials to incorporate a substantial amount of insoluble or inert material to act as a filler. We find, however, that if any substantial amount of water-soluble nonphenolic materials of the bark are present, the resistance to water of the resulting resinous product formed from the phenolic bark extract is so reduced as to make the resin of little value.

If the bark is treated in accordance with the invention with a critical amount of caustic soda which is much less than that required to react with all the potentially soluble materials, and the reaction is carried out under closely defined critical limits, such as temperature and final caustic soda concentration, the caustic soda will selectively react with certain of the water-insoluble materials of the bark and produce a water-soluble derivative which together with the water-soluble constituents originally present in the bark results in a product of digestion which is relatively high in hydroxy aromatic content. This derivative can be used instead of the simple phenols commonly used in the manufacture of synthetic plastic compositions without impairment of the desired physical properties of such compositions or loss of resistance to water. Under the critical reaction conditions of the invention undesirable dilution of the phenolic material is minimized and destruction of phenolic hydroxyl groups which may take place with larger amounts of caustic soda or more drastic treatments is minimized or prevented.

Table I gives the phenolic hydroxyl percentages of the various bark products of the invention. Also as shown in more detail in Example I it has been determined that if the bark be digested with an aqueous sodium hydroxide solution equivalent to 0.16 part $Na_2O$ per part of bark instead of 0.05 part of $Na_2O$ that the amount of phenolic hydroxyl will be about two-thirds less. In making the determinations for the percentage of phenolic hydroxyl we used the method of Drs. Maranville and Goldschmid entitled "Ultraviolet Absorption Spectra as a Measure of Phenolic Hydroxyl Group Content in Polyphenolic Tannin-Like Materials," reported in Analytical Chemistry 26, 1423-27, September 1954.

The water-soluble polymeric phenolic products of the present invention, prepared under optimum conditions, are also characterized by their diffusion coefficients and average molecular weights.

In general, the molecular weights of polymeric materials such as those produced by the processes of this invention, very approximately inversely as the cube root of their diffusion coefficients, as determined by methods such as the one herein described. Accordingly, the diffusion coefficient (of the water-soluble polymeric phenolic derivative prepared by reacting hemlock bark with NaOH equivalent to 0.065 part NaOH per part of dry bark and in a solution concentration of 1.14%) was measured according to the general procedure published for ligno-sulfonates by Felicetta, Markham and McCarthy in the Journal of the American Chemical Society, vol. 71, page 2879, August 1949. It was found that the average diffusion coefficient of such a typical product of the invention was 18.3 which represents a molecular weight of about 3770.

In using the foregoing method, since the soluble products of the invention are polydisperse, it is necessary to measure the average diffusion coefficient in a purely arbitrary but reproducible manner, and the value of $C_x/2C_0$ was, therefore, read from the probability plot at $X^{-10}$ mm. Measurements were carried out at a wave length of 277.7 millimicrons. Relative molecular weights may be calculated from the values of the diffusion coefficients D obtained by the foregoing method by applying the Stokes-Einstein equation which assumes spherical non-interacting, non-hydrated molecules. Applying this formula to the values of D, the molecular weight cited above was obtained.

As compared to water solutions of tannins which are soluble in acids, the soluble phenolic products of the invention in water solution are largely insoluble in acids. They have, however, properties which are equivalent or superior to tannins (which are obtainable only in smaller yield from bark) for other uses in alkaline solutions, such as deflocculating agents in alkaline solutions. The soluble phenolic bark products are suitable as phenolic reactants and especially for replacing simple phenols in the production of resinous condensation products, and in forming complexes with borates such as boric acid. When produced as a spray dried powder it may be kept indefinitely without deterioration of polymerization and it remains readily and instantly soluble in water. It is nonirritating to the skin, noncorrosive and free flowing.

For optimum results in the production of resins in many cases it has been found advantageous to use the soluble phenolic bark derivatives of this invention in conjunction with minor proportions of simple phenols, such as phenol or resorcinol, the latter being in the proportion of 25% to 35% of the total phenolic product. The resulting resinous products, even though containing other minor proportions of simple phenols have been found to have as good physical properties as if 100% simple phenols had been used as the phenolic reactant. In using simple phenols, such as phenol or resorcinol along with the soluble polymeric bark derivatives to produce resins, the simple phenols may be used in the form of water-soluble phenol-formaldehyde condensates or as the simple phenols themselves and added to the phenolic bark derivatives and then both reacted together with aldehydes or aldehyde producing compounds.

The soluble bark derivatives of the invention will tend to react more rapidly with formaldehyde in the presence of alkali than will phenol itself. Therefore, where it is desirable to produce a thermosetting resin which will not undergo further condensation to an insoluble resin until heated under conditions of use and will give satisfactory end properties, it is desirable to make certain modifications in the normal resin formulation procedures whereby the reaction between formaldehyde and the soluble phenol bark derivative is substantially retarded. In the production of certain types of resinous compositions, the greater speed of reaction of the soluble bark derivatives as compared to phenol may actually be advantageous as in the production of ion exchange resins in which the reactants are caused to polymerize in solution to a gel.

In the formation of resinous materials, the products of the invention may be reacted with formaldehyde itself or with equivalent forms of a chemical such as paraformaldehyde, or with chemicals which will release substantial amounts of free formaldehyde only on application of heat, such as hexamethylene tetramine.

The products of the invention are soluble in aqueous solutions of alcohols such as ethyl alcohol, isopropyl alcohol and the like and may, where desired, be reacted with aldehydes in aqueous alcoholic solution.

The invention will be described further by reference to the following examples which set forth specific illustrative embodiments thereof in which parts are expressed in parts by weight unless otherwise specified.

EXAMPLE I

Bark of the western hemlock was processed in a hammer mill until the subdivided bark passed a screen having about 2 meshes to the inch. The subdivided bark was placed in an open steam heated steel vessel which was provided with a stirrer, and for each equivalent of 100 parts bone dry bark a dilute caustic soda solution was added composed of 6.5 parts NaOH (equivalent to 0.05 $Na_2O$ to bark) and 670 parts water. The charge was heated to 97° C., stirred and held at this temperature for two hours, at which time the reaction was substantially completed, that is to say nearly all of the sodium had been consumed.

The resulting reaction mixture was drained on a screen of about 60 by 40 meshes to the inch, a vacuum was applied to the underside of the screen and the mass was washed by displacement with hot water. The resulting solution of this compound was then clarified and spray dried. It comprised alkali-containing, water-solubilized polymeric materials. The solution was spray dried without further evaporation. The dried product was completely water-soluble. The gross yield of the soluble bark derivative was 37.2 parts of dry powder per 100 parts of bone dry bark. This yield is equivalent to about 30% of the actual bark constituents, the undissolved residue therefore consisting of about 70% of the solids of the original bark. The residue contained a considerable amount of potentially alkali-soluble material differing in its chemical composition from the product of this example.

The spray dried product was a brown, free flowing non-hygroscopic powder. Analysis of this product is shown below. Except where otherwise indicated, all values are on the basis of bone or oven dry material.

*Analysis of product of Example I*

| | |
|---|---|
| Moisture | percent 5 |
| Sodium | do 8.5 |
| Calcium | do 0.2 |
| Sulfur | do 0.07 |
| Chlorine | do 0.04 |
| Sulfated ash | do 28 |
| Methoxyl | do 1.1 |
| pH value of 1% solution | 9.4 |

Average diffusion coefficient of aromatic portion of product, $D = 18.3$ mm.$^2$ per day
Average molecular weight of aromatic portion of product = 3770 (calculated from the value D)
Reducing value, 0.79 gm. $Cu_2O$/gm. dry sample

SUGARS BY CHROMATOGRAPHY

| | Unhydrolyzed | Hydrolyzed |
|---|---|---|
| | Percent | Percent |
| Glucose | 0.1 | 1 |
| Mannose | Negligible | 1 |
| Arabinose | do | 1.2 |
| Xylose | do | 0.2 |
| Phenolic hydroxyl | do | 11.6 |

EXAMPLE II

Bark from western hemlock was processed in a hammer mill until the subdivided bark passed a screen having about two meshes to the inch. The subdivided bark was placed in a pressure vessel equipped with an agitator, and for each equivalent of 100 parts bone-dry bark a dilute caustic soda solution was added composed of 4.0 parts NaOH (equivalent to 0.03 $Na_2O$ to bark) and 670 parts water. The charge was heated to 125° C. and held at this temperature for 30 minutes with agitation, at which time the reaction was substantially completed; that is to say, nearly all the sodium hydroxide had been consumed.

The resulting reaction mixture was drained on a screen of about 60 by 40 meshes to the inch, a vacuum was applied to the underside of the screen and the mass was washed by displacement with hot water. The resulting solution of this compound was then clarified and spray dried. It comprised alkali-containing, water-solubilized polymeric materials. The solution was spray dried without further evaporation. The dried product was completely water-soluble. The gross yield of the soluble bark derivative was 28.2 parts of dry powder per 100 parts of bone-dry bark. This yield is equivalent to about 23% of the actual bark constituents, the undissolved residue therefore consisting of about 77% of the solids of the original bark. The residue contained a considerable amount of potentially alkali-soluble material differing in its chemical composition from the product of this example.

The spray dried product was a brown, free-flowing non-hygroscopic powder with a phenolic hydroxyl content, as determined by the method of Maranville and Goldschmid, of 13.1%.

EXAMPLE III

Bark from western hemlock was processed in a hammer mill until the subdivided bark passed a screen having about two meshes to the inch. The subdivided bark was placed in a pressure vessel equipped with an agitator, and for each equivalent of 100 parts bone-dry bark, a dilute caustic soda solution was added composed of 4.0 parts NaOH (equivalent to 0.03 $Na_2O$ to bark) and 670 parts water. The charge was heated to 150° C. and held at this temperature for 20 minutes with agitation, at which time the reaction was substantially completed; that is to say, nearly all of the sodium hydroxide had been consumed.

The resulting reaction mixture was drained on a screen of about 60 by 40 meshes to the inch, a vacuum was applied to the underside of the screen and the mass was washed by displacement with hot water. The resulting solution of this compound was then clarified and spray dried. It comprised alkali-containing, water-solubilized polymeric materials. The solution was spray dried without further evaporation. The dried product was completely water-soluble. The gross yield of the soluble bark derivative was 31.6 parts of dry powder per 100 parts of bone-dry bark. This yield is equivalent to about 26.5% of the actual bark constituents, the undissolved residue therefore consisting of about 73.5% of the solids of the original bark. The residue contained a considerable amount of potentially alkali-soluble material differing in its chemical composition from the product of this example.

The spray dried product was a brown, free-flowing non-hygroscopic powder with a phenolic hydroxyl content, as determined by the method of Maranville and Goldschmid, of 12.2%.

The products described in the foregoing examples were used to make thermosetting phenol-formaldehyde condensation product adhesives by using the products of the present invention for about two-thirds of the phenolic material and phenol for the remainder. These products had very excellent properties as adhesives for plywood. For example, Douglas fir plywood panels prepared using each of the foregoing products of our invention were tested by the procedures given in the Douglas fir Plywood Commercial Standard CS5-48 (eighth edition) and in each case the results obtained were substantially in excess of the requirements specified by the Douglas Fir Plywood Association for boilproof exterior-type plywood. They also are somewhat better than another such condensation product similarly made except that an equal amount of a water extract of Western hemlock bark was used instead of the product of the invention. The water extract was made by digesting the mark with water for two hours at 85° C. whereby about 10% solids were extracted. The water extract contained about 65% tannin. Thus the products of the invention obtained in yields from about 23% to about 37% are at least as good for the manufacture of the described adhesives as the water extract from the same bark which was obtained in only about 10% yield.

A third solubilized product was made from the bark by a process like that of Example I except that the amount of sodium hydroxide used (0.16 as $Na_2O$) was in excess of the amounts used in the invention. About twice as much of the bark substance was solubilized as in the case of the product of Example I, and the resulting product contained a much lower content of phenolic hydroxyl (5.1%). When this product was used to make a thermosetting adhesive in the manner of making the two previously described adhesives, the resulting adhesive was distinctly inferior and from it there could be made only plywood of inferior grade of unsatisfactory resistance to water. The bark products of the invention contain at least 6% of phenolic hydroxyl. Below this content of phenolic hydroxyl excessive contamination with solubilized miscellaneous non-phenolic constituents of the bark takes place and the product is degraded.

Table I shows the effect of time, temperature and total caustic to bark ratio on the reaction between the caustic solution and the bark, and also the relationship between the yield obtained and the phenolic hydroxyl of the product.

Table I

| Bark Species: | $Na_2O$:Bark Ratio | Time at Temp., min. | Temp., °C. | Yield, Percent | Phenolic Hydroxyl, Percent |
|---|---|---|---|---|---|
| Southern yellow pine (Blend of Slash pine, Long-leaf pine and Loblolly pine) | 0.03 | 120 | 65 | 18.8 | 8.5 |
| | 0.05 | 120 | 97 | 31.7 | 8.3 |
| | 0.10 | 120 | 125 | 53.4 | 8.3 |
| | 0.20 | 120 | 90 | 68.4 | 5.8 |
| *Pinus Echinata* | 0.05 | 30 | 150 | 36.2 | 9.1 |
| Sitka spruce | 0.03 | 120 | 65 | 34.4 | 8.3 |
| | 0.05 | 120 | 97 | 50.0 | 6.6 |
| | 0.05 | 120 | 150 | 55.3 | 6.0 |
| | 0.10 | 120 | 125 | 67.3 | 7.1 |
| | 0.20 | 120 | 90 | 82.0 | 5.7 |
| White fir (*Abies amabilis*) | 0.03 | 120 | 65 | 22.0 | 5.7 |
| | 0.05 | 120 | 97 | 34.7 | 8.0 |
| | 0.10 | 120 | 125 | 54.6 | 4.7 |
| | 0.20 | 120 | 90 | 66.8 | 3.6 |
| Douglas fir | 0.03 | 120 | 65 | 19.8 | 6.3 |
| | 0.05 | 120 | 97 | 32.2 | 8.2 |
| | 0.05 | 120 | 150 | 46.8 | 6.0 |
| | 0.10 | 120 | 125 | 65.9 | 6.2 |
| | 0.20 | 120 | 90 | 87.2 | 4.9 |
| Western hemlock | 0.02 | 30 | 97 | 14.4 | 10.5 |
| | 0.04 | 30 | 97 | 19.7 | 12.3 |
| | 0.06 | 30 | 97 | 25.1 | 13.1 |
| | 0.02 | 30 | 125 | 20.0 | 11.0 |
| | 0.04 | 30 | 125 | 28.2 | 13.1 |
| | 0.06 | 20 | 125 | 38.7 | 12.6 |
| | 0.02 | 20 | 150 | 23.5 | 10.0 |
| | 0.04 | 20 | 150 | 31.6 | 12.2 |
| | 0.06 | 20 | 150 | 35.4 | 13.0 |
| | 0.02 | 30 | 175 | 25.0 | 10.3 |
| | 0.04 | 30 | 175 | 35.2 | 10.9 |
| | 0.06 | 30 | 175 | 46.6 | 10.2 |
| | 0.03 | 120 | 97 | 30.7 | 10.6 |
| | 0.05 | 120 | 97 | 32.6 | 12.5 |
| | 0.08 | 120 | 97 | 48.2 | 7.7 |
| | 0.10 | 120 | 97 | 58.2 | 7.5 |
| | 0.03 | 120 | 150 | 36.0 | 8.9 |
| | 0.05 | 120 | 150 | 47.3 | 9.6 |
| | 0.10 | 120 | 150 | 57.2 | 7.1 |
| | 0.16 | 120 | 150 | 77.2 | 5.4 |
| KOH expressed as $Na_2O$:Bark Ratio | 0.05 | 120 | 97 | 29.5 | 10.6 |
| | 0.05 | 120 | 150 | 42.2 | 8.7 |
| | 0.10 | 120 | 150 | 58.8 | 7.1 |

The soluble bark derivatives of our invention are very effective additives as deflocculants and dispersing agents to control the rheological properties of muds used in drilling gas and oil wells. When combined with borates they are very effective for such uses.

It is well known that drilling muds must have certain properties or characteristics and that these be maintained in proper balance throughout the drilling operation. The gel forming, viscosity and filtration characteristics of a drilling mud are very important. The gel rate and gel strength are important in controlling the settling of cuttings in the bore hole and of weighting material in the mudpits. The viscosity is important in providing a pumpable mud in which cuttings are circulated out of the well and from which they settle out in the mud pits. Filtration characteristics are important because they are a means of controlling "water loss" and the ability of the mud to "plaster out" on the bore hole wall and form a thin filter cake of low permeability.

Table II gives the results of tests carried out according to the procedure of the American Petroleum Institute as described in "Recommended Practice for Standard Field Procedure for Testing Drilling Fliuds" (API, RR29, 3rd ed., May 1950). In these tests a common type of caustic soda-organic thinner drilling mud was used.

The bark derivatives tested in the foregoing table were prepared by digestions in aqueous solutions with sodium hydroxide to bark ratios of 0.05 (expressed as $Na_2O$) for two hours at a temperature of 97° C.

This application is a continuation-in-part of our application Serial No. 330,004, filed January 7, 1953 and now abandoned.

Table II

| Bark Derivative | lbs./bbl. Additive | pH | Drilling Mud Tests | | | Filtration | |
|---|---|---|---|---|---|---|---|
| | | | Viscosity, cp. | Gel, 0 | Strength, 10 min. | ml./30 min. | Cake, in. |
| Control | 0 | 8.5 | 21.8 | 20.7 | 44.5 | 10.0 | ⅛ |
| Hemlock | 2 | 8.5 | 15.6 | 6.5 | 18.5 | 8.0 | ⅛ |
| Control | 0 | 12.0 | Too thick to test | | | | |
| Hemlock | 2 | 12.0 | 22.4 | 1.0 | 24.6 | 7.5 | ⅛ |
| Control | 0 | 8.5 | 21.3 | 20.6 | 31.6 | 10.0 | 1/16 |
| Sitka Spruce | 2 | 8.5 | 14.6 | 1.5 | 13.4 | 7.5 | 1/16 |
| Control | 0 | 12.0 | Too thick to test | | | | |
| Sitka Spruce | 2 | 12.0 | 33.7 | 2.5 | 46.2 | 8.0 | 1/16 |
| Control | 0 | 8.5 | 21.3 | 20.6 | 31.6 | 10.0 | 1/16 |
| White fir | 2 | 8.5 | 13.6 | 2.7 | 15.1 | 8.0 | 1/16 |
| Control | 0 | 12.0 | Too thick to test | | | | |
| White fir | 2 | 12.0 | 34.7 | 9.5 | 82.8 | 8.0 | 1/16 |
| Control | 0 | 8.5 | 22.2 | 22.5 | 42.4 | 10.5 | 1/16 |
| Douglas fir | 2 | 8.5 | 12.6 | 1.5 | 13.6 | 7.0 | 1/16 |
| Control | 0 | 12.0 | Too thick to test | | | | |
| Douglas fir | 2 | 12.0 | 26.5 | 1.5 | 46.1 | 7.5 | 1/16 |
| Control | 0 | 8.5 | 22.2 | 22.5 | 42.4 | 10.5 | 1/16 |
| Southern pine | 2 | 8.5 | 12.0 | 1.5 | 12.3 | 8.0 | 1/16 |
| Control | 0 | 12.0 | Too thick to test | | | | |
| Southern pine | 2 | 12.0 | 23.4 | 3.3 | 65.2 | 8.0 | ⅛ |

We claim:

1. A water-soluble aromatic product containing at least 6% phenolic hydroxyl obtained by digesting a bark of the group consisting of Western hemlock, Douglas fir, Western white fir, Sitka spruce and Southern Yellow pine in a water solution of an alkali hydroxide of the group consisting of sodium hydroxide and potassium hydroxide at a temperature of from 65° C. to 185° C., until a part of the water-insoluble portion of the bark is converted to a water-soluble alkali derivative thereof and alkali hydroxide equivalent to from 0.03 to 0.10 part $Na_2O$ per part of dry bark is combined with bark substance of the product, and separating the water-soluble product from the residue.

2. The product resulting from the digestion of claim 1 in which the reaction temperature is about 95° C. to about 150° C.

3. The product resulting from the digestion of claim 1 in which the alkali is sodium hydroxide, the phenolic hydroxyl content of the product being at least 6%.

4. The product resulting from the digestion of claim 1 in which 100 parts of dry bark are heated in a caustic soda solution containing about 6.5 parts of sodium hydroxide to about 670 parts water and the charge is heated to about 97° C. until substantially all of said sodium hydroxide is combined as a water-soluble alkali derivative of the bark substance.

5. The product resulting from the digestion of claim 1 in which the concentration of the water solution of alkali is equivalent to about 0.5% to about 2.00% NaOH.

6. The product resulting from the digestion of claim 1 in which the concentration of the water solution of alkali is equivalent to about a 1.0% solution of sodium hydroxide.

7. The product resulting from the digestion of claim 1 having a calculated molecular weight of about 3770.

8. The product resulting from the digestion of claim 1 in which 100 parts of dry bark are heated in a caustic soda solution containing about 6.5 parts of sodium hydroxide to about 670 parts water and the charge is heated at a temperature of about 125° C. for about 30 minutes until substantially all of said sodium hydroxide is combined as a water-soluble alkali derivative of the bark substance.

9. The product resulting from the digestion of claim 1 in which the bark was digested for about 2 hours at about 97° C. with an alkali hydroxide to bark ratio of 0.05 (expressed as $Na_2O$).

10. The product resulting from the digestion of claim 1 in which the bark was digested for about 30 minutes at about 150° C.

11. The product of claim 1 which is in the solid state.

12. The process of making a water-soluble phenolic product which comprises digesting a bark of the group consisting of Western hemlock, Douglas fir, Western white fir, Sitka spruce and Southern Yellow pine in a water solution of an alkali-metal hydroxide of the group consisting of sodium and potassium hydroxide at a temperature of from 95° C. to 185° C. and in the proportion of the equivalent of from 0.03 to 0.10 part $Na_2O$ per part of dry bark, until substantially all of the alkali-metal hydroxide has reacted with the bark substance and a portion of the insoluble part of the bark is solubilized, and separating the water-soluble phenolic product from the residue.

13. The process in accordance with claim 12 in which the concentration of the water solution of the alkali-metal hydroxide is equivalent to about 0.5% to about 2.0% sodium hydroxide.

14. The process in accordance with claim 12 in which the bark content of the reaction mixture is equivalent to about 10% to about 20% of dry bark and the remainder is the water solution of the alkali-metal hydroxide.

15. The process of stabilizing a product made in accordance with claim 12 which comprises removing the water until a solid product is formed.

16. The process of stabilizing the product made in accordance with claim 12 which comprises flash drying the water solution of the bark substance produced.

17. The process of making a water-soluble aromatic hydroxyl product which comprises digesting a mixture of 100 parts of a bark of the group consisting of Western hemlock, Douglas fir, White fir, Sitka spruce and Southern Yellow pine in a water solution of sodium hydroxide which contains about 6.5 parts of sodium hydroxide and about 670 parts water at a temperature of from 65° C. to 150° C., until a portion of the water-insoluble bark substance is solubilized and the product contains at least 6% of phenolic hydroxyl, and then separating the water solution of the product thus produced from the residue.

18. A water-soluble aromatic product comprising at least 6% phenolic hydroxyl produced by digesting a bark of the group consisting of Western hemlock, Douglas fir, White fir, Sitka spruce and Southern Yellow pine in an aqueous solution of sodium hydroxide having a concentration of about 1% and containing about 0.065 part sodium hydroxide per part of bark at a temperature of from 65° C. to 150° C. for from 0.5 to 2 hours, said bark product having combined therewith from 0.04 to 0.13 part of sodium hydroxide per part of dry bark.

19. A water-soluble phenolic reactant in accordance with claim 18 which has been converted to dry, stable form without essential change in chemical characteristics by flash drying.

No references cited.